United States Patent Office 3,533,948
Patented Oct. 13, 1970

3,533,948
PROCESS FOR PRODUCING MAGNESIUM MANGANESE FERRITE CORES

Clarence Herbert Heckler, Jr., Palo Alto, and Paul David Baba, San Carlos, Calif., assignors to Stanford Research Institute, Menlo Park, Calif., and Amplex Corporation, Redwood City, Calif., both corporations of California No Drawing. Filed Dec. 6, 1967, Ser. No. 688,305
Int. Cl. C04b 35/26, 35/36
U.S. Cl. 252—62.64 9 Claims

ABSTRACT OF THE DISCLOSURE

A method for processing magnetic ferrite core structures is provided whereby the threshold for driving the core from a partially saturated state toward a fully saturated state is increased without any substantial alteration of the other desirable properties for a core structure used for logical operations. This is achieved by firing the green state structure in its final firing process in an oxygen containing gas, preferably flowing past the structure at a substantially constant temperature of from 1200° C. to 1350° C. and slowly cooling the structure in a flowing inert gas such as nitrogen to below Curie temperature.

The invention described herein wa made in the performance of work under a NASA contract and is subject to the provisions of section 305 of the National Aeronautics and Space Act of 1958, Public Law 85–568 (72 stat. 435; 42 U.S.C. 2457).

BACKGROUND OF THE INVENTION

Field of the invention

The present invention relates to the processing of magnetic materials and more particularly to the production of ferrite components having enhanced partial set state characteristics suitable for use in circuitry performing logical operations.

Description of the prior art

In the production of magnetic ferrite structures, a variety of characteristics of the final product are affected by processing parameters such as composition, green density, mixing, firing and calcining temperature, firing time and rates of heating and cooling. Both the physical properties and the magnetic properties vary depending on the processing condition. Furthermore, special partially saturated state properties are required in the fabrication of components such as magnetic cores useful in logic circuits and random access memories. In the utilization of magnetic cores in logical operations, not only are the two saturated states employed, but a partially saturated or set state is required. The cores that have been produced have too low a threshold in the partially saturated state. As a result, drives which are applied for affecting, certain cores, will also affect cores which should be left in their partial set state.

SUMMARY OF THE INVENTION

Accordingly, it is an object of the invention to provide a process for reliably producing ferrite components of the type useful in logic circuits and magnetic memories, for example.

Yet another object of the invention is the provision of a simple and reliable method of processing magnetic ferrite structures to enhance the partial set state properties such that the threshold MMF required to produce a specified change of flux is increased.

These and other objects and many of the attendant advantages of the invention will become apparent as the description proceeds.

It has been found according to the invention that the magnetic properties of a ferrite element processed in accordance with the invention are enhanced by conducting the final firing or soaking in an oxygen containing atmosphere and slowly cooling the element in an inert gas introduced at a temperature below the soak temperatures.

The invention will become better understood by reference to the following detailed description.

BRIEF DESCRIPTION OF THE PREFERRED EMBODIMENTS

Compositions which can be processed to possess the desired characteristics are within the boundaries for the square-loop of the magnesium, manganese, iron system. These boundaries are:

(A) 55 mol percent MgO, 4 mol percent MnO and 41 mol percent $Fe_2O_3$
(B) 46 mol percent MgO, 4 mol percent MnO and 50 mol percent $Fe_2O_3$
(C) 5 mol percent MgO, 45 mol percent MnO and 50 mol percent $Fe_2O_3$
(D) 5 mol percent MgO, 70 mol percent MnO and 25 mol percent $Fe_2O_3$.

Particularly preferred compositions embraced within A, B, C, D are those containing 20 to 30 mol percent MnO, 25 to 35 mol percent MgO and 35 to 45 mol percent $Fe_2O_3$. For example, a composition containing on a mol basis 24.9% MnO, 32.2% MgO and 42.8% $Fe_2O_3$ exhibits superior performance as will be shown in Table II. The percentages given above are final percentages and the ferrites may be formed directly from the metal oxides or from decomposable precursor compounds which furnish the oxide such as carbonates, peroxides or oxalates. The ternary compositions may further contain other materials such as cadmium, zinc, calcium or thoria.

The compositions can be formed into an element preliminary to firing either as a pressing powder or as a castable slurry. In preparing pressing powders, the oxides or precursors are mixed by ball milling with a binder such as polyvinyl alcohol or an acrylic resin and a lubricant such as stearic acid. The composition is subjected to standard ceramic processes of pressing, grinding, screening and calcining. The calcined material may be again ball-milled and screened. The material is again mixed with a temporary binder and pressed in a compacting press to obtain a green compact ready for final firing. Increasing the green density tends to lower the partial-set-state threshold as long as the density is not sufficiently high so that the core crumbles, breaks or shows signs of laminating. Good results have been obtained by pressing with 300 to 1,500 pounds to obtain green densities of about 2 to 3.5 g./cm.$^3$ In the slurry process, the procedure parallels that discussed above up to and including the first firing (calcining) the ferrite materials are then mixed with a wetting agent, a plasticizer, a binder and a solvent and optionally ball-milled for 16 hours. The slurry is all then placed in a vacuum chamber, where a partial vacuum is applied for approximately one-quarter hour or until entrapped bubbles have all been removed. The slurry is removed from the vacuum chamber and cast onto a smooth substrate by a doctor blade technique into a sheet about 0.030 inch thick. The sheet is then air-dried, and toroids of the desired dimension are die-punched from the green-state ferrite sheet. It has been found that the utilization of thermoplastic resin in the preparation of the slurry yields sheets that have less tendency to warp and are flexible and thus more readily handled and die-punched.

Cores are produced by utilizing a flowing, controlled atmosphere tube furnace. The green state ferrite elements may be inserted into the furnace at or near soak temperature or may be inserted at ambient temperature and slowly heated to soak temperature of from 100° C. per hour to 500° C. per hour. The soak temperature is desirably maintained within the range of 1200° C. to 1350° C. for 2 to 20 hours to obtain the desired threshold and partial set state properties. Soaking at lower temperatures results in too high a threshold while soaking at higher temperature or may be inserted at ambient temperature and slowbe controlled within 5° C. Superior elements are produced by slowly heating an element at a rate of 200° C. per hour to a soak temperature between 1270° C. and 1290° C., and maintaining this temperature for four hours and then cooling in oxygen or air to a temperature 25° C. to 125° C. below soak temperature before introducing nitrogen. The cooling is continued at a rate of 100° C. per hour to 500° C. per hour, preferably 200° C. per hour, to below the Curie temperature of the element. Earlier introduction of the nitrogen or soaking in nitrogen has been found to result in elements with less desirable magnetic properties.

The flowing air furnace utilized permitted good heat control and easy insertion and removal of the elements. The furnace consisted of a horizontal tube in which was suspended an aluminum oxide cylinder surrounded by Globar heating elements. The Globar elements were adjusted and maintained at the desired temperature by means of a proportional controller. The elements were placed in a platinum boat inside the aluminum oxide cylinder, and the oxygen, air or nitrogen gas was flowed through the tube.

Purity of the starting materials must also be controlled in order to obtain satisfactory reproducibility. It is necessary to maintain the level of harmful impurities below about 0.010 mol percent. The final composition in atoms per formula unit of several representative batches prepared from $MgCO_3$, $MnCO_3$ and $Fe_2O_3$ are listed below.

TABLE I

| No. | Mg | Mn | Fe | Zn | O | Other |
|---|---|---|---|---|---|---|
| 1 | 0.675 | 0.525 | 1.800 | ---------- | 4 | |
| 2 | 0.488 | 0.525 | 1.800 | ---------- | 4 | Cd-0.180<br>Ca-0.010 |
| 3 | 0.390 | 0.525 | 1.8 | 0.120 | 4 | Cd-0.165<br>Ca-0.003 |

Two to six percent thorium oxide can be optionally added to Composition No. 1.

These compositions were formulated into pressing powders as discussed above and 305 mil toroids were prepared which were finally fired in air and cooled to yield elements having the properties given below:

TABLE II

| Composition No. | Firing temp. | Time | $N_2$ temp. | TH oersteds | Partial set TH(ps) oersteds (del. $\phi$=50%) | Set state reset TH(pc) oersteds (del. $\phi$=50%) |
|---|---|---|---|---|---|---|
| 1 | 1265 | 4 | 1225 | 2.276 | 2.623 | 1.510 |
| 1 | 1250 | 4 | 1225 | 2.435 | 2.769 | 1.757 |
| 1 | 1225 | 4 | 1225 | 2.253 | 1.472 | 1.642 |
| 1 | 1200 | 4 | 1200 | 3.088 | 3.660 | 2.150 |
| 2 [1] | 1300 | 10 | 1225 | 0.617 | 0.857 | 0.378 |
| 1 | 1280 | 4 | 1225 | 1.756 | 2.137 | 1.389 |
| 1 | 1272 | 4 | 1225 | 1.850 | 2.227 | 1.431 |
| 1 | 1270 | 4 | 1200 | 1.935 | 2.493 | 1.523 |

[1] 0.050 in. core fired in oxygen.

By TH is meant the clear state threshold. THps is the partial set state threshold or the threshold to be exceeded to drive the core from the partial set state to positive saturation. THpc is correspondingly the threshold to be exceeded when driving the core from the partial set state to negative saturation.

The heating and cooling cycle in each case was heated at 200° C. per hour to soak temperature, maintaining that temperature for the soak period in the presence of flowing air or oxygen, commencement of the cooling cycle at a rate of 200° C. per hour and switching the flowing atmosphere to nitrogen at the indicated temperature and continuing the cooling at the same rate.

It is to be understood that the foregoing only relates to exemplary embodiments of the invention and that numerous modifications, substitutions and alterations are all permissible without departing from the scope of the invention as defined in the following claims.

What is claimed is:

1. A method of producing magnesium-manganese magnetic ferrites having a composition within the boundaries of:

(a) 55 mol percent MgO, 4 mol percent MnO and 41 mol percent $Fe_2O_3$,
(b) 46 mol percent MgO, 4 mol percent MnO and 50 mol percent $Fe_2O_3$,
(c) 5 mol percent MgO, 45 mol percent MnO and 50 mol percent $Fe_2O_3$; and
(d) 5 mol percent MgO, 70 mol percent MnO and 25 mol percent $Fe_2O_3$, comprising the steps of:

heating a magnetic ferrite component having said composition at a rate of 100° C. per hour to 500° C. per hour in a molecular oxygen containing gas containing about as much molecular oxygen as air to a soak temperature of 1200° C. to 1350° C., maintaining the component at said temperature from 3 to 20 hours;

cooling the component in the molecular oxygen containing gas to a temperature below soak temperature at a rate of 100° C. per hour to 500° C. per hour;

introducing an inert gas when the component is at a temperature 25° C. to 125° C. below the soak temperature and continuing the cooling at said rate to below the Curie temperature of the component.

2. A method according to claim 1 in which the inert gas is flowed past the component.

3. A method according to claim 1 in which the oxygen containing gas is selected from oxygen or air.

4. A method according to claim 1 wherein the ferrite contains in mol percent about 20 to 30 percent MnO, 25 to 35 percent MgO and 35 to 45 percent $Fe_2O_3$.

5. A method according to claim 4 in which the ferrite contains about 25% MnO, 32% MgO and 43% $Fe_2O_3$.

6. A method according to claim 4 in which the ferrite further contains cadmium, zinc, thorium or calcium.

7. A method according to claim 4 in which the component is heated and cooled in a flowing gas atmosphere.

8. A method according to claim 7 in which the component is heated from ambient temperature in flowing air at 200° C. per hour to a temperature of 1270° C. to 1290° C., held at a selected temperature for 4 to 10 hours, cooled at a rate of 200° C. per hour in flowing air to a temperature of 1150° C. to 1225° C., introducing flowing nitrogen and continuing the cooling at said rate until the component is below Curie temperature.

9. A method according to claim 1 in which said heating is conducted in a flowing gas atmosphere containing at least as much molecular oxygen as air.

References Cited

UNITED STATES PATENTS

| | | | |
|---|---|---|---|
| 2,981,689 | 4/1961 | Albers-Schoenberg | 252—62.64 |
| 3,027,327 | 3/1962 | Blank | 252—62.64 |

TOBIAS E. LEVOW, Primary Examiner

R. D. EDMONDS, Assistant Examiner

U.S. Cl. X.R.

252—301.1